United States Patent [19]
Hotard

[11] 3,790,989
[45] Feb. 12, 1974

[54] CARCASS SPLITTING MACHINE
[76] Inventor: Septime R. Hotard, 390 N.W. Bay St., Ponchatoula, La. 70454
[22] Filed: June 27, 1972
[21] Appl. No.: 266,635

[52] U.S. Cl. .................................................. 17/23
[51] Int. Cl. ............................................ A22b 5/20
[58] Field of Search ....................................... 17/23

[56] References Cited
UNITED STATES PATENTS
2,904,826  9/1959  Hotard .................................. 17/23
2,027,397  1/1936  Meyer .................................... 17/23

Primary Examiner—Robert Peshock
Attorney, Agent, or Firm—Berman, Bishoff & Platt

[57] ABSTRACT

A device is described for splitting an animal carcass vertically while the carcass moves along overhead rails. The splitting operation is performed by a band saw which is supported on a generally triangularly shaped frame and is disposed at a 45° angle to the direction of travel of the carcass along the rails. The band saw is driven by a motor which causes it to travel over four flanged guide wheels which are mounted between spaced transversely disposed I-beams on self-centering adjustable bearings.

15 Claims, 4 Drawing Figures

Patented Feb. 12, 1974  3,790,989

CARCASS SPLITTING MACHINE

This invention relates generally to butchering apparatus, and more particularly to an apparatus for splitting a carcass vertically while the carcass is being moved along an overhead rail structure.

In the past, all slaughtering of animals for food purposes was performed on the slaughter house floor as was the dressing operation. Today, it is required that dressing be done on rails suspended above the floor for sanitary and health reasons. However, there is no known, commonly used automatic apparatus for splitting the carcass so that it may then be dressed on the rails without requiring the intervention of a human operator. Rather, the splitting operation is commonly performed by a hand-held power saw. This results in a severe slow-down in the carcass-splitting and dressing operation, with a resultant loss in efficiency and productivity.

Accordingly, the primary object of the present invention is to provide a new and improved carcass splitting machine which is simple in construction, which is easy to operate, and which splits a carcass vertically in a rapid and efficient manner without the need for a human operator during the splitting operation.

A further object of the present invention is to provide a carcass splitting apparatus which is readily adapted for mass production techniques.

Still another object of the present invention is to provide an improved carcass splitting apparatus which involves inexpensive components, which is durable in construction, which operates to cut a carcass into two segments in a neat, efficient and accurate manner, substantially along the vertical central line of the carcass, and which is arranged so that the carcass may be supported for longitudinal movement on the guide rail after the splitting operation so that the severed sides of the carcass may be conveyed directly to the cooler or refrigerating apparatus without the need for manipulation by a human operator.

Further objects, features and advantages of the invention will become apparent from the following detailed description when taken in conjunction with the accompanying drawings, wherein.

Figure 1:
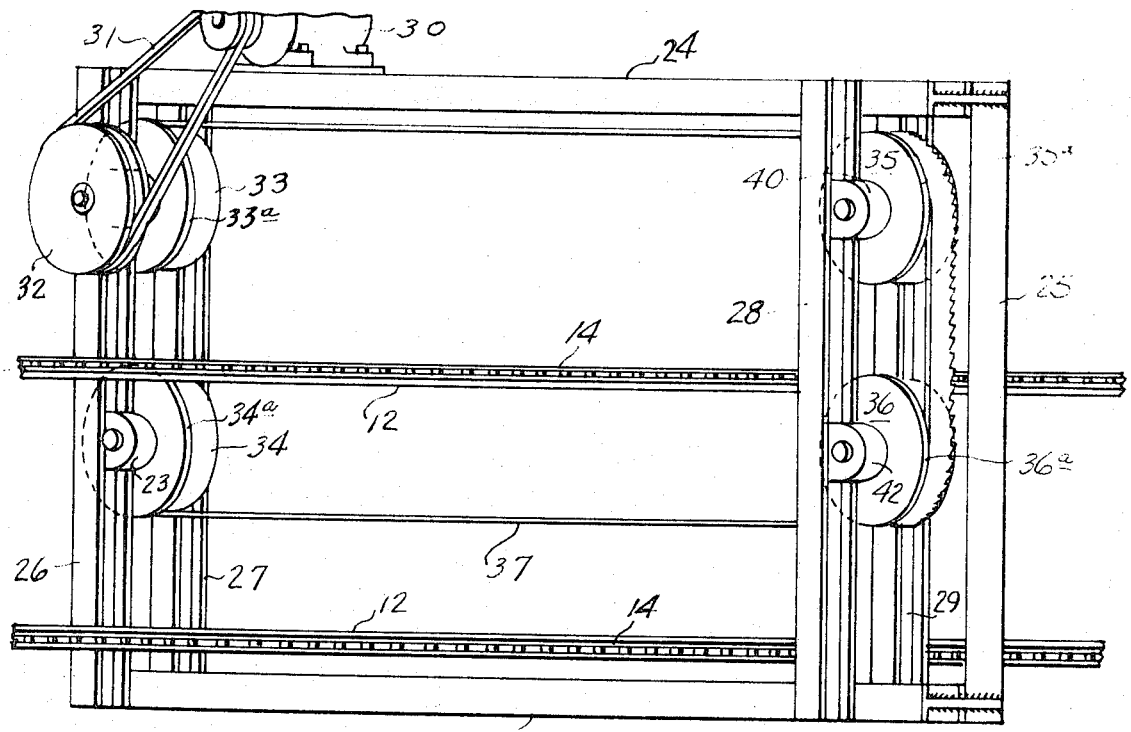
FIG. 1 is a top plan view, partially broken away, of the carcass splitting apparatus according to the present invention.

Referring now to the drawings, it will be seen that the improved carcass splitting apparatus of the present invention is supported on a frame of generally triangular configuration, designated by the reference numeral 20. Frame 20 comprises spaced parallel vertical supporting members 21 joined at their upper ends by horizontal support member 25. Depending from opposite ends of horizontal support member 25 are spaced parallel diagonal support members 24 which extend downwardly and to the left, as viewed in FIG. 2, at an angle of approximately 45° to the horizontal. All the above-described frame members may comprise I-beams or other similar structural members. The entire frame assembly 20 may be fixedly mounted, or otherwise supported on platform or base 23.

Figure 2:
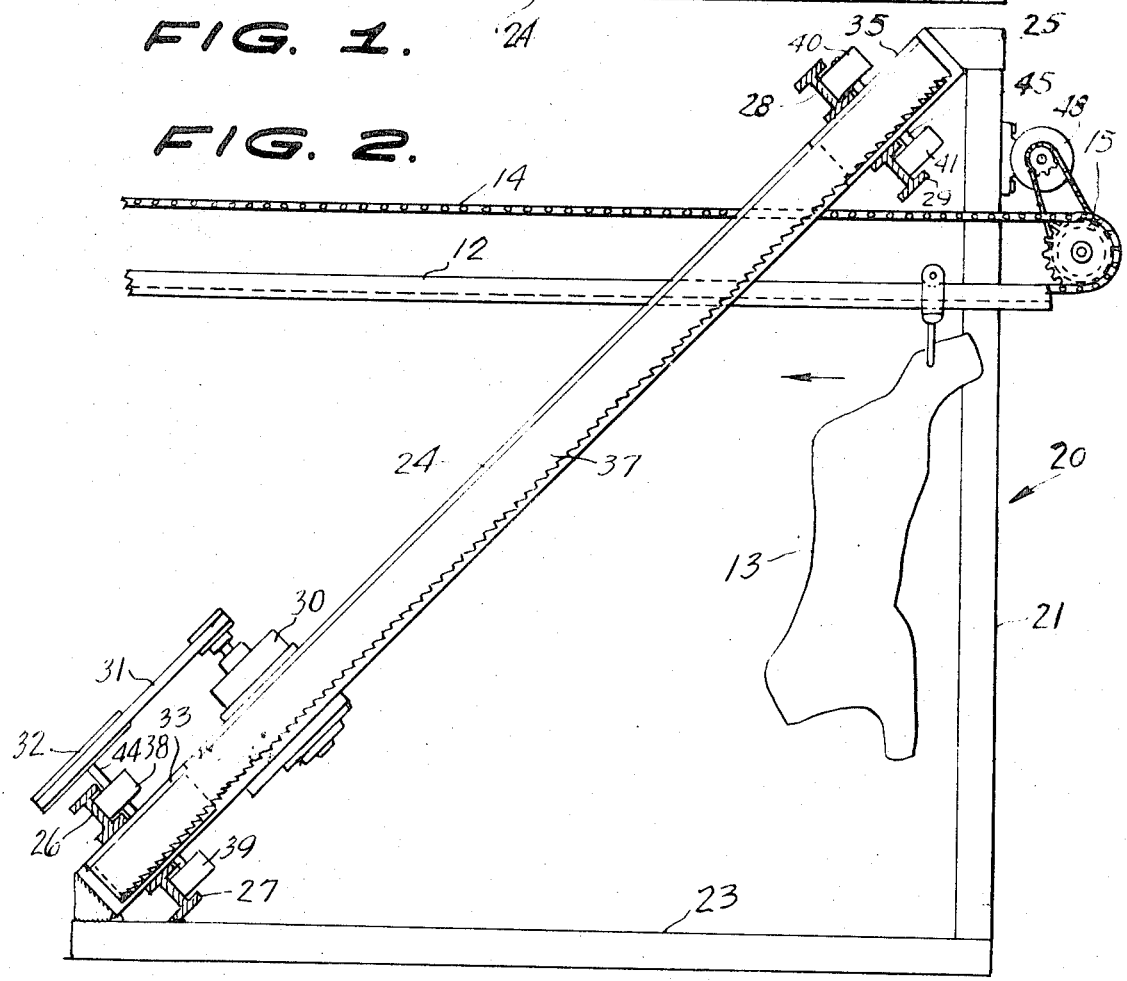
FIG. 2 is a side elevational view, looking from the front of FIG. 1, with certain parts omitted for clarity.
Figure 3:
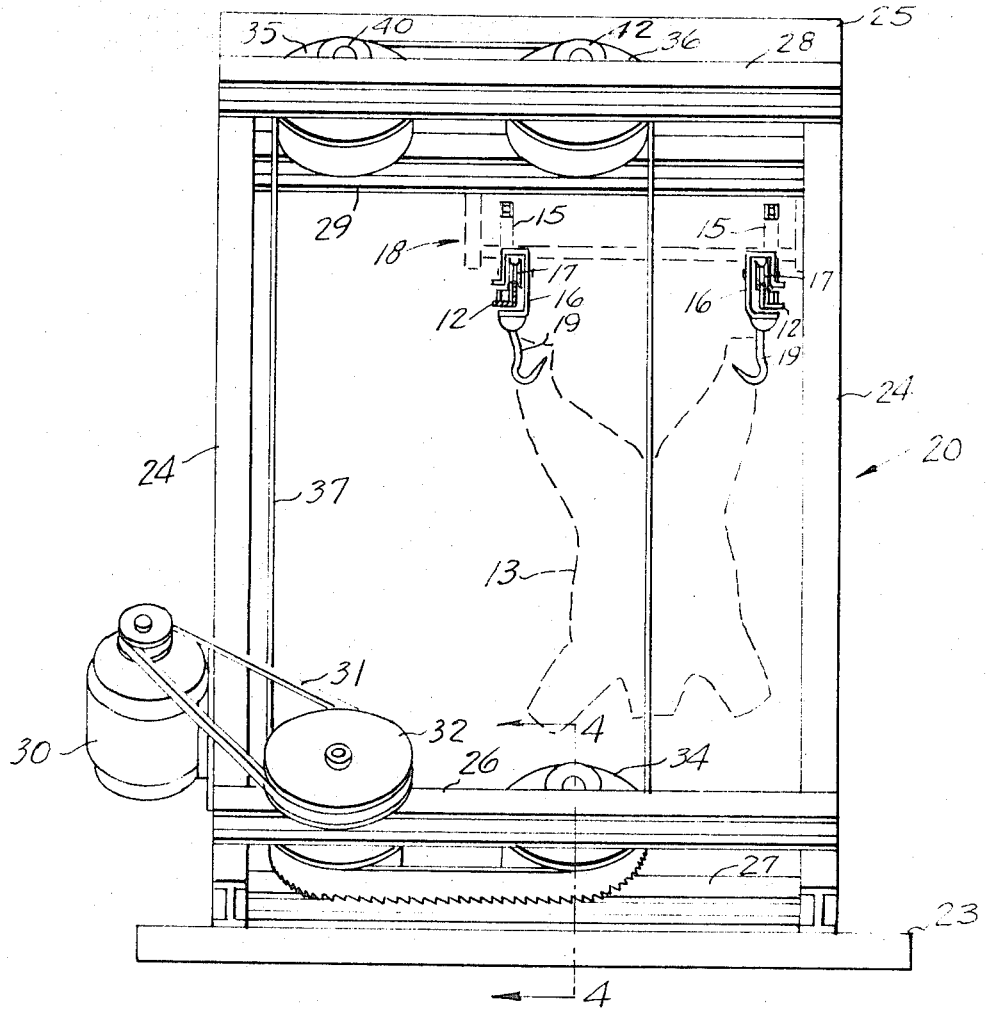
FIG. 3 is a front elevational view, looking from the left in FIG. 2.

Rails 12, which are of any suitable cross-sectional shape and which may be, for example, of L cross-sectional configuration, as shown in FIG. 3, are adapted to support a carcass 13 for movement therealong, by means of a pair of carriage members 16,16, engaged on the top edges of the vertical flanges of rails 12,12, the carriage members being provided with suitable rollers 17, so that they may move easily along the rails. Each carriage member is provided with a depending hook 19, adapted to be engaged in a hind leg of the carcass in the manner illustrated in FIGS. 2 and 3, so that the carcass will be suspended vertically between the rail members 12,12 in the manner illustrated in FIG. 3.

Rails 12,12 may be supported in any conventional manner 18 and are on opposite sides of one section of band saw 37, as will be described more fully hereinbelow. Carriage members 16 are attached to and driven by sprocket chains 14 which in turn are driven by sprocket wheels 15 from motor 48. Thus, carcass 13 may be advanced continuously along rails 12, automatically, by the power drive from motor 48.

The manner in which the band saw 37 is mounted and driven will now be described. Welded, or otherwise permanently fastened between diagonal frame members 24 are two pairs of spaced parallel I-beams 26 and 27, at the lower left-hand portion of members 24, as viewed in FIG. 2, and I-beams 28 and 29 at the upper right-hand portion of members 24, as viewed in FIG. 2.

Figure 4:
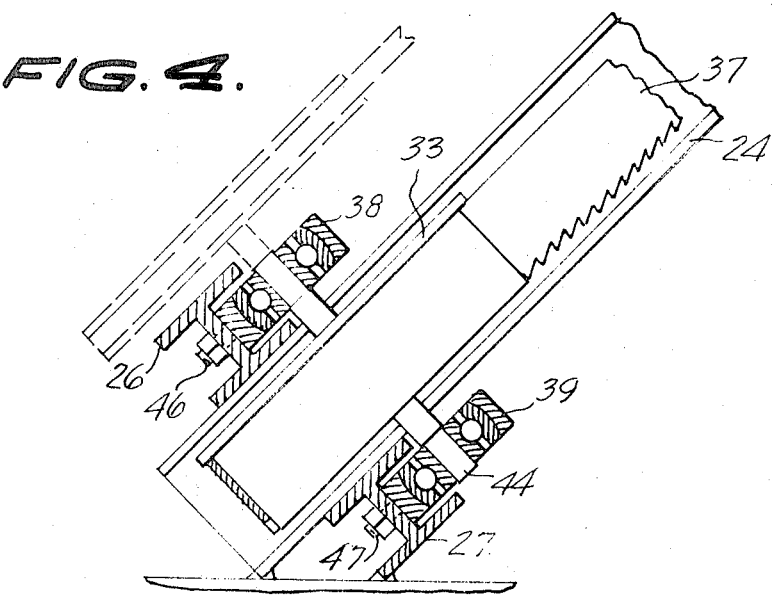
FIG. 4 is an enlarged fragmentary sectional view, taken on the line 4—4 in FIG. 3, and looking in the direction of the arrows.

Mounted between I-beams 26 and 27 are guide wheels 33 and 34 having, respectively, flanged edges 33a and 34a. Guide wheel 33 is journaled between self-centering adjustable bearings 38 and 39 by means of shaft 44. See FIG. 4 for the details of the aforedescribed mounting. As shown therein, nut and bolt assemblies 46 and 47 are provided for permitting adjustment of the mounting of bearings 38 and 39 along I-beams 26 and 27, respectively, so as to permit a variation in the spacing between respective pairs of guide wheels, in order to increase the tension on band saw 37. Guide wheel 34 is mounted between I-beams 26 and 27 on bearing 43 and another identical bearing, not shown, in a manner identical to that described above with respect to guide wheel 33.

Disposed between I-beams 28 and 29 are guide wheels 35 and 36, having respectively, flanged edges 35a and 36a. Guide wheel 35 is mounted between bearings 40 and 41 and guide wheel 36 is mounted between bearings 42 and another identical bearing, not shown, in a manner identical to that described above with respect to guide wheel 33.

Stretched around guide wheels 33, 34, 35 and 36 is band saw 37, formed as an endless belt, with its cutting edge facing the direction of travel of carcass 13, as shown in FIG. 2, and with its non-cutting edge abutting against flanges 33a, 34a, 35a and 36a of the guide wheels. Rigidly attached to shaft 44 is fly wheel 32 which is driven by belt 31 from motor 30. Motor 30 is mounted by any conventional means on one of diagonal frame members 24, as for example the upper diagonal frame member 24, as seen in FIG. 1.

In operation, the rotation of fly wheel 32 will cause band saw 37 to travel along the path defined by the four guide wheels 33, 34, 35 and 36. The speed at which the band saw travels can, of course, be regulated by the speed of motor 30 and by the diameter of fly wheel 32, for example. Motor 48 drives sprocket wheels 15 and causes carcass 13 to advance along rails 12 towards the rapidly moving cutting edge of band saw 37, as seen in FIG. 2 and FIG. 3. The carcass will be vertically split by band saw 37 and the severed halves of the carcass will continue their travel along rails 12 into the cooler, refrigerator or other destination where further processing, such as dressing, is to take place. Thus, from the time the carcass 13 is placed on rails 12 and motors 48 and 30 are turned on, no further intervention of a human operator is necessary. It has been found that by utilizing the apparatus of the present invention, between 50 and 60 carcasses can be split per hour, a production rate greatly in excess of any presently known apparatus.

In a typical embodiment of the invention, the band saw 37 was 30 feet long and 7-¼-inches wide and was mounted at a 45° angle. Guide wheels 33, 34, 35 and 36 were 18-inches wide with a one-quarter inch flanged edge. Each guide wheel was mounted on a 2-inch steel shaft which was fitted in two 2-inch pillow block bearings. I-beams 26, 27, 28 and 29 were 4-inches by 4-inches across, while I-beams 24 were 4-inches by 8-inches across and 14-feet long. Motor 30 had an output of 1-½ horsepower while motor 48 was one-half horsepower.

While certain specific embodiments of the invention have been shown and described, it will be realized that those skilled in the art will readily perceive variations which may be made therein without departing from the spirit and scope of the invention. For example, a greater or less number of guide wheels may be used than illustrated herein. Therefore, it is intended that the scope of the present invention be limited only by the claims appended hereto.

I claim:

1. A device for automatically cutting carcasses comprising:
   a. a pair of spaced parallel rails for supporting a carcass for movement therealong;
   b. a band saw;
   c. means for fixedly mounting said band saw at an acute angle with respect to said rails so as to present a continuous cutting edge to said carcass as it is moved along said rails; and
   d. means for driving said band saw.

2. The carcass cutting device set forth in claim 1, wherein said means for mounting said band saw comprises first spaced parallel beams disposed at approximately a 45° angle with respect to said rails.

3. The carcass cutting device set forth in claim 2, wherein said means for mounting said band saw further includes a plurality of guide wheels around which said band saw passes.

4. The carcass cutting device set forth in claim 3, further including means mounted on said first spaced parallel beams for supporting said guide wheels.

5. The carcass cutting device set forth in claim 4, wherein said means for supporting said guide wheels comprises second spaced parallel beams connected between and disposed perpendicularly with respect to said first spaced parallel beams.

6. The carcass cutting device set forth in claim 5, further including bearing means mounted on said second spaced parallel beams for rotatably mounting said guide wheels between respective pairs of said second spaced parallel beams.

7. The carcass cutting device set forth in claim 6, wherein said means for driving said band saw comprises a motor mounted on one of said first spaced parallel beams and drivingly linked to one of said guide wheels.

8. The carcass cutting device set forth in claim 7, wherein each of said guide wheels has one flanged side disposed opposite to the cutting edge of said band saw for counteracting the cutting force exerted by said band saw.

9. The carcass cutting device set forth in claim 1 further including means for automatically moving said carcass along said rails toward the cutting edge of said band saw and past said band saw.

10. The carcass cutting device set forth in claim 9, wherein said means for moving said carcass comprises motor driven chain and sprocket wheel means.

11. A device for cutting carcasses comprising:
   a. a pair of spaced parallel rails for supporting a carcass for movement therealong;
   b. a band saw;
   c. means for mounting said band saw at an acute angle with respect to said rails so as to present a cutting edge to said carcass as it is moved along said rails, said means for mounting comprising:
      i. first spaced parallel beams disposed at approximately a 45° angle with respect to said rails;
      ii. second spaced parallel beams connected between and disposed perpendicularly with respect to said first spaced parallel beams
      iii. bearing means mounted on said second spaced parallel beams; and
      iv. a plurality of guide wheels around which said band saw passes, said guide wheels being rotatably mounted on said bearing means between respective pairs of said second spaced parallel beams; and
   d. means for driving said band saw.

12. The carcass cutting device set forth in claim 11, wherein said means for driving said band saw comprises a motor mounted on one of said first spaced parallel beams and drivingly linked to one of said guide wheels.

13. The carcass cutting device set forth in claim 12, wherein each of said guide wheels has one flanged side disposed opposite to the cutting edge of said band saw for counteracting the cutting force exerted by said band saw.

14. The carcass cutting device set forth in claim 11, further including means for moving said carcass along said rails toward the cutting edge of said band saw.

15. The carcass cutting device set forth in claim 14, wherein said means for moving said carcass comprises motor driven chain and sprocket wheel means.

* * * * *